(12) United States Patent
Serlet et al.

(10) Patent No.: US 7,693,962 B2
(45) Date of Patent: Apr. 6, 2010

(54) METHOD AND SYSTEM FOR SEAMLESSLY ACCESSING REMOTELY STORED FILES

(75) Inventors: Bertrand Serlet, Palo Alto, CA (US); Avadis Tevanian, Jr., Los Altos Hills, CA (US); Clark H. Warner, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 752 days.

(21) Appl. No.: 10/994,007

(22) Filed: Nov. 19, 2004

(65) Prior Publication Data
US 2005/0091222 A1    Apr. 28, 2005

Related U.S. Application Data

(63) Continuation of application No. 09/642,632, filed on Aug. 18, 2000, now Pat. No. 6,842,770.

(51) Int. Cl.
*G06F 15/16* (2006.01)
(52) U.S. Cl. .................................................. 709/219
(58) Field of Classification Search ................ 709/246, 709/226, 219
See application file for complete search history.

(56) References Cited

U.S. PATENT DOCUMENTS

| | | | | | |
|---|---|---|---|---|---|
| 5,263,162 | A | * | 11/1993 | Lundeby | 717/143 |
| 5,778,384 | A | * | 7/1998 | Provino et al. | 707/200 |
| 5,802,366 | A | * | 9/1998 | Row et al. | 709/250 |
| 6,078,929 | A | | 6/2000 | Rao | |
| 6,115,741 | A | * | 9/2000 | Domenikos et al. | 709/219 |
| 6,119,151 | A | * | 9/2000 | Cantrell et al. | 709/216 |
| 6,212,640 | B1 | * | 4/2001 | Abdelnur et al. | 713/201 |
| 6,408,298 | B1 | * | 6/2002 | Van et al. | 707/10 |
| 6,629,127 | B1 | * | 9/2003 | Deen et al. | 709/203 |
| 6,654,794 | B1 | * | 11/2003 | French | 709/219 |

(Continued)

FOREIGN PATENT DOCUMENTS

EP    0780778 A2    6/1997

(Continued)

OTHER PUBLICATIONS

Network Working Group. HTTP Extensions for Distributed Authoring—WebDAV. Y. Goland et al. Feb. 1999. Reference found at http://www.ietf.org/rfc/rfc2518.txt.*

(Continued)

*Primary Examiner*—Benjamin R Bruckart
(74) *Attorney, Agent, or Firm*—Blakely, Sokoloff, Taylor & Zafman LLP

(57) ABSTRACT

A system and method by which users via programs on one computer may seamlessly access files remotely stored on other computers that run a well known file access protocol. An operating system extension and an application level network access program are provided. The operating system extension receives file system requests for remote files from the operating system that were issued according to a well known application program interface. The operating system extension forwards the remote file system request to the network access program. The network access program reformats the request according to a well known application level network protocol extension and sends it over a network to a remote computer system.

26 Claims, 7 Drawing Sheets

U.S. PATENT DOCUMENTS 6,675,353 B1 * 1/2004 Friedman .................... 709/246
7,062,541 B1 * 6/2006 Cannon et al. .............. 709/219

FOREIGN PATENT DOCUMENTS

| EP | 0986012 | A2 | | 3/2000 |
|----|---------|----|----|--------|
| EP | 1003110 | A2 | | 5/2000 |
| WO | WO 97/46956 | | * | 12/1997 |
| WO | WO 97/46956 | A | | 12/1997 |
| WO | WO 97/46956 | A1 | | 12/1997 |
| WO | WO 00/14632 | A1 | | 3/2000 |

OTHER PUBLICATIONS

RD 426078A, Virtual File System Across Multiple Network Nodes and Discs, 19991010, Int Business Machines Corp, Derwent Acc No. 1999-631863.*

PCT International Search Report for PCT International Appln No. US01/25640, mailed Oct. 31, 2003 (8 pages).

European Search Report mailed Apr. 13, 2007, for European patent application No. 06026175.7, filed Aug. 15, 2001, 3 pages.

Winer, Dave, "XML-RPC for Newbies," Online, Jul. 14, 1998, pp. 1-4, XP002427222, retrieved from the internet, URL:http://davenet.smallpicture.com/1998/07/14xmlRpcForNewbies.html, Mar. 27, 2007.

Sun Microsystems et al., "NFS: Network File System Protocol Specification," IETF Standard, Internet Engineering Task Force, IETF, CH, Mar. 1989, XP015006037 ISSN: 000-0003.

Network Working Group. HTTP Extensions for Distributed Authoring—WebDAV. Y. Goland et al. Feb. 1999. Reference found at http://www.ietf.org/rfc/rfc2518.txt.

RD 426078A, Virtual File System Across Multiple Network Nodes and Discs, 19991010, Int Business Machines Corp, Derwent Acc No. 1999-631863.

* cited by examiner

METHOD AND SYSTEM FOR SEAMLESSLY ACCESSING REMOTELY STORED FILES

This application is a continuation application of U.S. patent application Ser. No. 09/642,632, filed Aug. 18, 2000 now U.S. Pat. No. 6,842,770.

BACKGROUND

1. Field of the Invention

This invention relates to a the field of networked file systems and personal computers. More specifically, the invention relates to a system and method that allows personal computer users to access files over a network that are located on a remote computer system from any program on the local personal computer.

2. Background

Traditionally, most computers were used at work and may have been connected within a company by a local area network (LAN). The company's LAN may have been connected to other offices or partners of the company by a wide area network (WAN), or a company's computers may have been directly connected to a WAN. Such connections allow for companies to easily share data by storing and retrieving data on remote computers over private networks. In addition, remote disk storage available over a network is used to back up data from local computers, thus freeing up local disk space.

The internet is a publicly accessible global wide area network. The internet and personal computers have become ubiquitous in modern society. People regularly connect to web sites via their personal computer for any number of purposes. Although the internet has existed in various forms for many years, the internet only became popular as a mass communication vehicle with the introduction of the world wide web. The world wide web is, from the user's perspective, a way of easily identifying a remote computer, connecting to the remote computer, and viewing information stored on the remote computer. However, until recently, personal computer users have not used the internet and web sites for personal data storage and retrieval.

While using the internet, hidden from the user are the various communications protocols that make the internet function. Various committees and ad hoc groups known as working groups coordinate and control the internet. The Internet Engineering Task Force (IETF) is the protocol engineering and development arm of the internet. Working groups under the IETF determine the rules and protocols for the underlying functionality of the internet and publish them as requests for comment, commonly referred to as RFCs. Each working group makes its RFCs available via the internet at various web sites. A central point for obtaining the RFCs referenced below is the IETF's web site, www dot ietf dot org (No mailing address or geographic location is provided by the IETF). In addition, an organization called the World Wide Web Consortium (W3C) has been formed to continue the work of the IETF, although, the IETF and the W3C exist concurrently. (See www dotw3c dot org; The W3C may be contacted at Massachusetts Institute of Technology, Laboratory for Computer Science, 545 Technology Square, Cambridge, Mass. 02139).

Web sites are specified by a text description or name referred to as a uniform resource locator (URL) that is now encompassed by the term uniform resource identifier (URI). (See Uniform Resource Identifiers (URI): Generic Syntax, RFC 2396, August 1998, Draft Standard). Information is communicated over the word wide web via the transmission control protocol/internet protocol, commonly referred to as TCP/IP. (For more information see A TCP/IP Tutorial, RFC 1180, January 1991). An application level protocol running on top of TCP/IP that allows for accessing remote computers via the internet by specifying a URI is the hypertext transfer protocol (HTTP, see HTTP1.1, RFC 2616, June 1999, Draft Standard). It is the widespread acceptance and use of HTTP that has made the world wide web as we know it possible. Extensions to HTTP for distributed authoring and versioning via the world wide web, referred to as WebDAV, are beginning to be widely used. (See WebDAV, RFC 2518, February 1999, Proposed Standard). The WebDAV extensions to HTTP require that communication pursuant to the WebDAV protocol be formatted according to the extensible markup language (XML). (see XML 1.0 available from www dot w3dot org/TR/RED-xml). WebDAV allows persons using programs that support WebDAV to access files stored on a WebDAV enabled HTTP server, more commonly referred to as a web site. WebDAV provides for reading, writing (i.e., creating), partial reading, partial writing, locking, property changes, and other access to remotely stored files.

Various companies have begun offering internet users free storage space on remote servers. These remote servers are web sites running WebDAV enabled HTTP with additional software running to provide a web based interface to the disk space made available on the remote server. Companies such as Xythos Software, Inc. of Redwood City, Calif. that provides a web site called Sharemation (www dot sharemation dot com), My Docs Online! Inc. of Naples, Fla. (www dot MyDoesOnline dot com), and Driveway Corporation of San Francisco, Calif. (www dot driveway dot com) allow personal computer users to create a directory on the company's web site and store files for secure personal use. These companies provide any personal computer user access to a remote storage device and provide a facility that allows personal computer users to write files to and retrieve files from the remote computer, thus providing the same benefits that were historically only available to companies or businesses via private networks.

However, these public access storage companies do not provide a seamless way for a personal computer user to access remotely stored files from all application programs on their personal computer. The companies only allow a user to drag and drop or otherwise store files to or retrieve files from the web site when the user is outside of application programs. Some of the public access remote storage web sites allow for access from one specified application program via extensions to the application program, or require the application to be run in conjunction with an internet web browser (such as Internet Explorer 5.0 from Microsoft Corporation of Redmond, Wash.). Although the companies provide remote storage for internet users, easy access is not provided for from all application programs on a personal computer.

BRIEF SUMMARY OF THE INVENTION

This invention provides a system and method by which users via programs on one computer may seamlessly access files remotely stored on other computers that run a well known file access protocol. As such, the method and system are referred to as the seamless file system or SFS. SFS allows all programs running on a personal computer to access remote files as easily and in the same manner as accessing files on the personal computer's file system without requiring any changes to the program's method of communicating with the computer's existing file system. In one embodiment, the SFS provides an operating system extension and an application level network access program. The operating system extension receives file system requests for remote files from the operating system that were issued according to a well known application program interface. The operating system extension forwards the remote file system request to the network access program. The network access program reformats the request according to a well known application level network protocol extension and sends it over a network to a remote computer system. The network access program receives responses over the network from the remote computer system in the well known format, processes the response, and forwards pertinent information to the operating system extension. The operating system extension then passes pertinent information to the program that issued the remote file system request via the well known application program interface. In one embodiment, the remote file system is cached on the local file system so that remote file system requests may be enacted on the locally cached copy. The locally cached copy of the remote file system and the remote file system are updated and synchronized upon the occurrence of defined events. In one embodiment, SFS seamlessly allows users of personal computers to access files on remote computers over the internet via the features of WebDAV enabled HTTP.

DETAILED DESCRIPTION

This invention provides a system and method by which users via programs on one computer may seamlessly access files remotely stored on other computers that run a well known file access protocol. As such, the method and system are referred to as the seamless file system or SFS. The goal of SFS is to allow seamless access to remotely stored documents by all personal computer file system clients. SFS allows all programs running on a personal computer to access remote files as easily and in the same manner as accessing files on the personal computer's file system without requiring any changes to the program's method of communicating with the computer's existing file system. In one embodiment, SFS seamlessly allows users of personal computers to access files via the internet by using the features of WebDAV enabled HTTP.

A. The Environment in which One Embodiment of the SFS Runs

Figure 1:
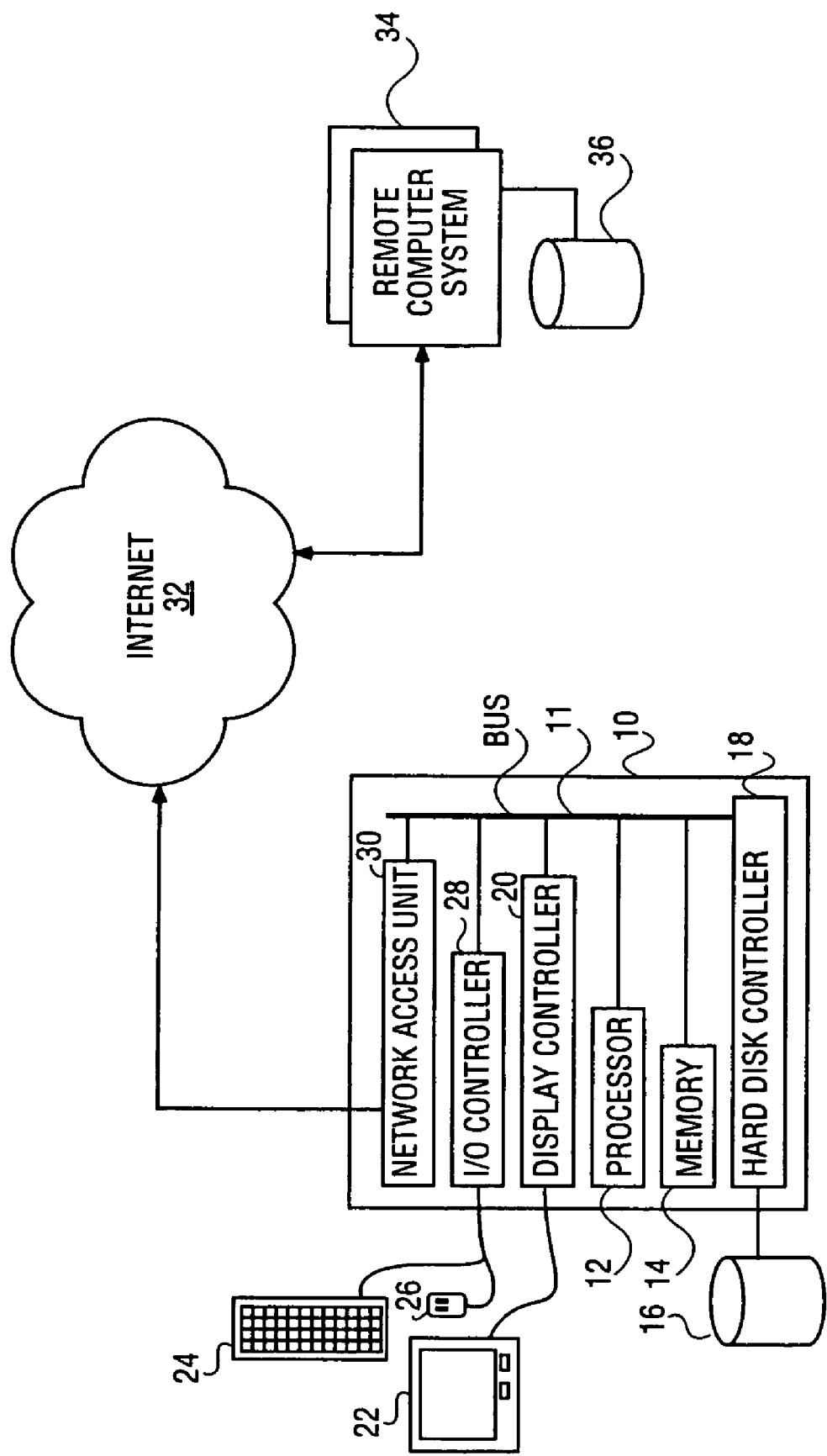
FIG. 1 depicts a computer system and network environment in which one embodiment of the method and system of the seamless file system is executed.

FIG. 1 depicts a computer system and network environment in which one embodiment of the method and system of the seamless file system is executed. SFS runs on a personal computer 10. Personal computer 10 may be any computing device that can execute software programs and access the internet, including, but not limited to, cellular telephones, personal digital assistants, desktop personal computers, portable computers, computer workstations, etc. Personal computer 10 comprises a processor 12 to execute software programs. Processor 12 may be any computer processor. When executing programs, the processor utilizes memory 14. Memory 14 may be any form of volatile random access memory (RAM). Information is read from and written to local storage device 16 coupled to the personal computer via controller 18. Storage device 16 may be a device that includes a machine readable medium such as, for example, writeable disk drives including, for example, a hard disk or a readable and writeable compact disk (CDRW), and other devices such as, for example, tape readers/writers and memory card readers/writers. The processor may communicate instructions to display controller 20 to display images on display device 22. Display controller 20 may be any display controller known to those skilled in the art, and display device 22 may be any display monitor known to those skilled in the art, including, but not limited to, a cathode ray tube (CRT) display monitor, or thin film transistor (TFT) display screen. A user accesses personal computer 10 via any computer input device known to those skilled in the art, such as, for example, keyboard 24 and mouse 26 which are coupled to the processor by an input/output (I/O) controller 28.

To access information not stored on local storage device 16, computer 10 includes a network access unit 30 which allows the personal computer to communicate over a network such as internet 32 with remote computer 34 and to access information stored on remote storage device 36. Network access unit 30 may be a modem or any other device for connecting to a network either directly or via a telephone dial-up connection. Remote computer 34 may be any kind of computer known to those skilled in the art, including, but not limited to, personal computers and servers. Remote storage device 36 may be any readable storage medium known to those skilled in the art such as, for example, hard disk drives or an array of hard disk drives. Although only one personal computer and one remote computer are depicted, multiple personal computers and multiple remote computers may be connected to internet 32. Processor 12, memory 14, local storage device 16, display controller 20, I/O controller 28 and network access unit 30, are coupled to one another via and communicate with one another over bus 11. Bus 11 may be any bus known to those skilled in the art. Although only one bus is depicted, multiple buses may be used in personal computer 10. In addition, other components and controllers known to those skilled in the art (not depicted) or multiple instances of depicted components and controllers may be included in personal computer 10.

B. The Software Architecture of One Embodiment of a Seamless File System

Figure 2:
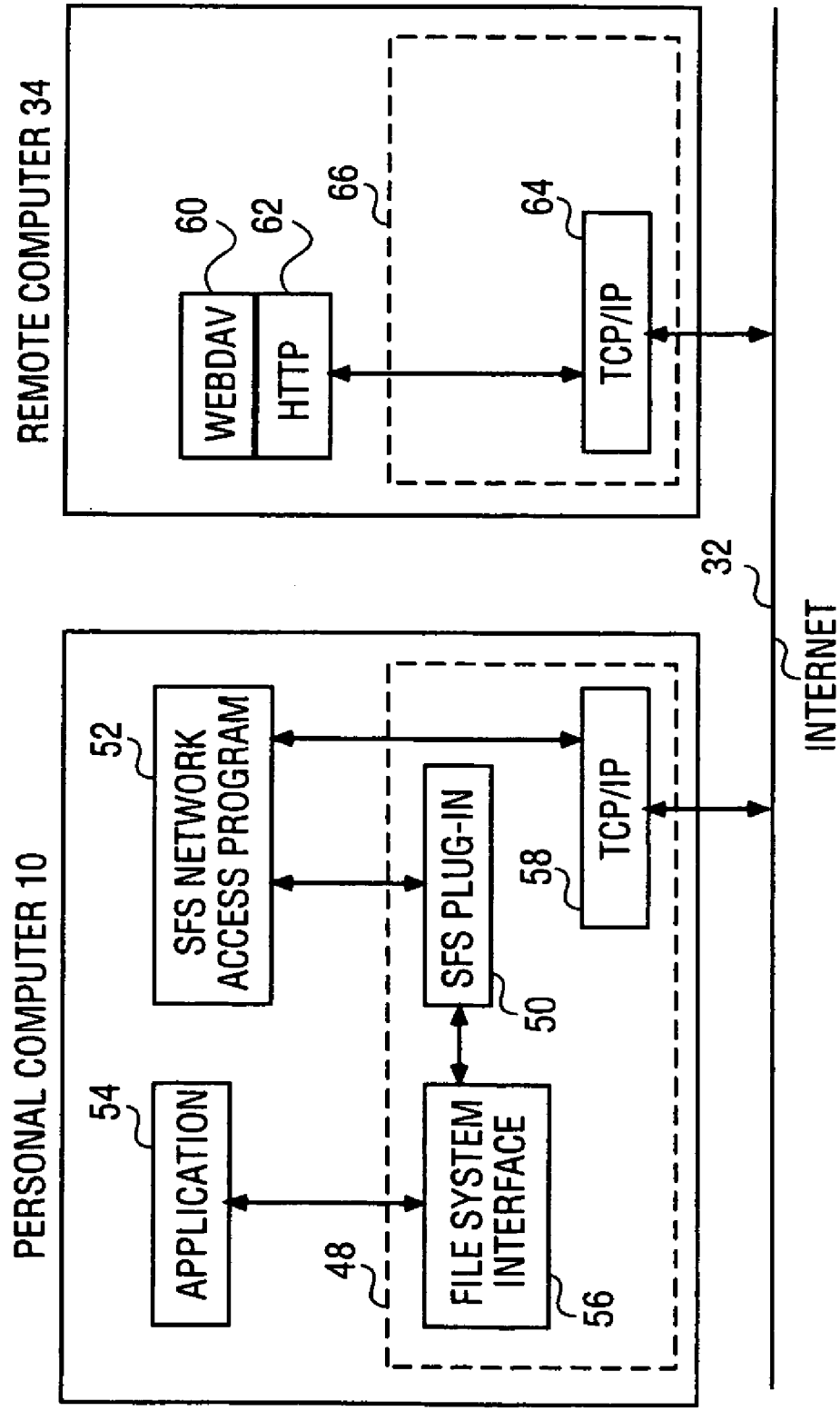
FIG. 2 depicts the software architecture of one embodiment of the seamless file system.

FIG. 2 depicts the software architecture of one embodiment of the seamless file system. In one embodiment, the personal computer 10 running the SFS includes an extension to the operating system referred to as SFS plug-in 50 and an application level program referred to as the SFS network access application program (or the SFS network access program) 52. Via file system interface 56, SFS plug-in 50 receives requests from an application program 54 which the application program 54 directed to the personal computer's file system interface 56, commonly referred to as an application program interface (API). SFS plug-in 50 provides for file system call parsing and communicates with SFS network access program 52 in addition to file system interface 56 of operating system 48. In one embodiment, the communication between SFS plug-in 50 and SFS network access program 52 is via local sockets.

SFS network access application program 52 is responsible for establishing network connections and protocol communication with remote computers such as remote computer 34 running a well-known application level internet protocol. In one embodiment, the well known protocol is WebDAV enabled HTTP. In such an embodiment, SFS network access program 52 is a WebDAV client that communicates via the TCP/IP transport layer 58 of operating system 48 over a network, such as the internet 32, with WebDAV enabled HTTP servers such as remote computer 34. In such an embodiment, remote computer 34 includes WebDAV enhanced 60 HTTP application level server software 62 which provides world wide web communications and file access over internet 32. In such an embodiment, remote computer 34 communicates via TCP/IP transport layer 64, which is part of operating system 66.

C. Using a Seamless File System

Figure 3:
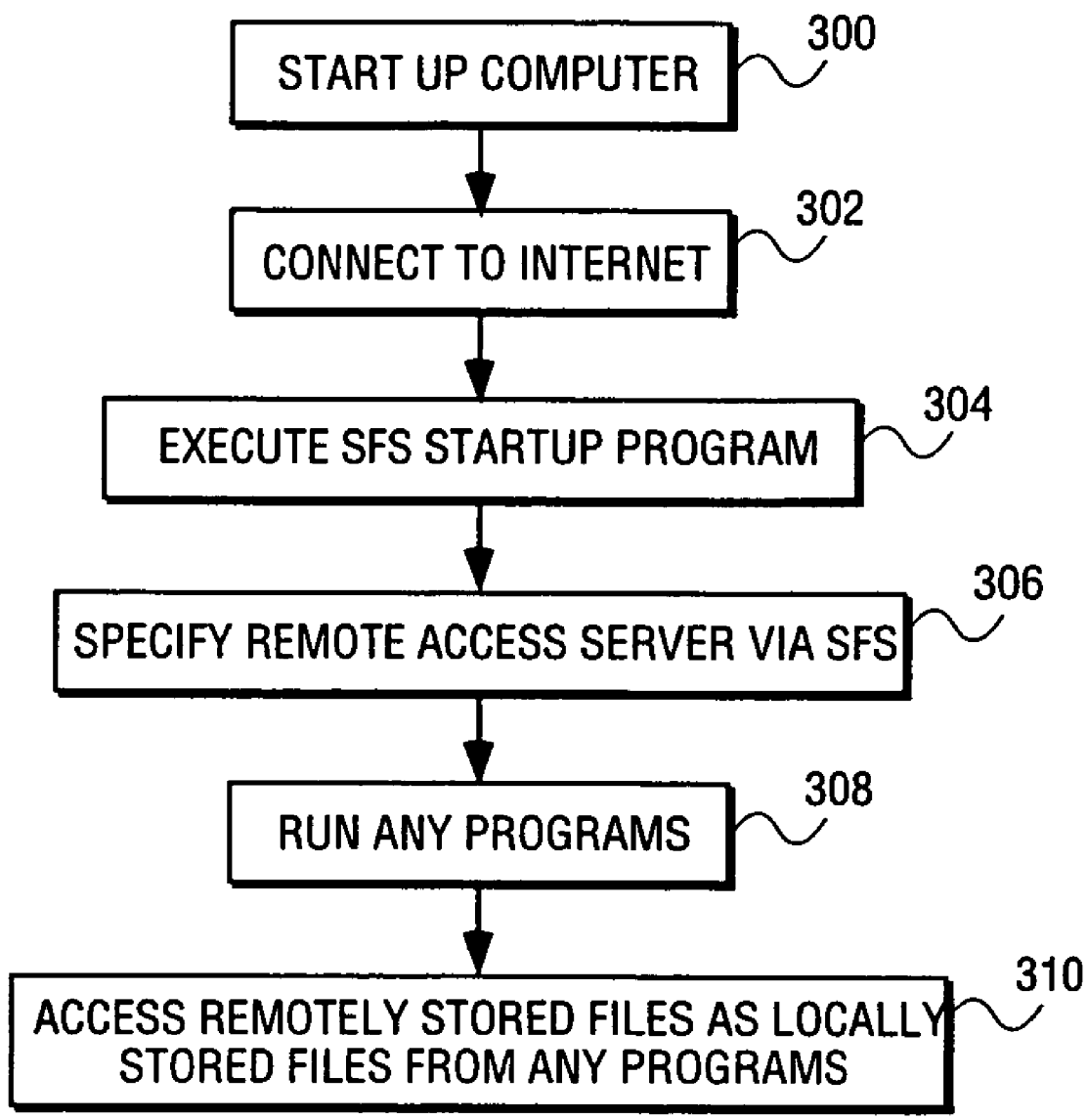
FIG. 3 depicts the flow of actions taken by a personal computer user according to one embodiment of the seamless file system method and system.

FIG. 3 depicts the flow of actions taken by a personal computer user according to the seamless file system method and system. After a user starts a personal computer, as shown in block 300, the user establishes a connection to the internet according to any method known to those skilled in the art, as shown in block 302. If the user has an "always on" internet connection, this step may be skipped. The user may then execute an SFS startup program, as shown in block 304, to mount the remote server so it appears as if it were a local disk drive. The user may execute the SFS startup program according to any method known to those skilled in the art, including, but not limited to, pull down menus or desktop icons. The SFS startup program requests that the user specify a remote file system to be added to a list of available drives, as shown in block 306. The SFS startup program may receive from the user, in one embodiment, text input of the name of the web site, the URI, on which the user's remote files reside. In another embodiment, the SFS startup program requires the user to specify a complete path to a directory on a remote web site that includes a URI. In yet another embodiment, the SFS startup program may also receive input specifying private network file servers. In this embodiment, if the private network server is not a WebDAV enabled HTTP server, the information is passed to the operating system to be handled according to methods known to those skilled in the art. In one embodiment, the SFS startup program may, after receiving a URI specifying a remote website, prompt the user to type in the name of the directory on the web site in which the remotely stored files reside. In another embodiment, the SFS startup program graphically prompts the user to select a remote file system and/or directory by pointing to and clicking on graphical images, and then may prompt for a password.

In another embodiment, the user may also be prompted by the SFS startup program to name the remote file system. This is achieved by methods known to those skilled in the art, such as by prompting the user to enter a textual name to represent the remote file system at the same time the SFS startup program requests a URI, or as a step after the URI is provided.

In one embodiment, after the user specifies the name of the remote file system server and the remote file system directory, this information is stored so that whenever the user connects to the internet, the remote file system is automatically mounted. In another embodiment in which the user has an "always on" connection to the internet, after the user specifies the name of the remote file system server and, in some embodiments, the remote file system directory, this information is stored so that whenever the user restarts the computer, the remote file system is automatically mounted. In these embodiments, the user may be asked by the SFS startup program whether a password providing authenticated access to the remote file system should be stored and not requested for future connections to the remote server, or whether the password should always be requested whenever the remote file system is to be mounted and accessed. In another embodiment, a key chain, such as that provided by with the Mac OS® 9 operating system available from Apple Computer, Inc. of Cupertino, Calif., may be used to store passwords to multiple remote file systems such that providing a single password to the key chain provides access to all of the passwords on the key chain.

After mounting the remote file system, the user runs any programs, as shown in block 308, and may then use any programs on the computer to access remotely stored files in the same way the user accesses files stored locally, as shown in block 310. The remote file system is accessed as if it were another hard disk drive stored on the user's computer. In one embodiment, when a user accesses a remote file for the first time, the SFS may then request the user to provide a password to authenticate access to the remote files.

D. Actions of a Seamless File System

Figure 4A:
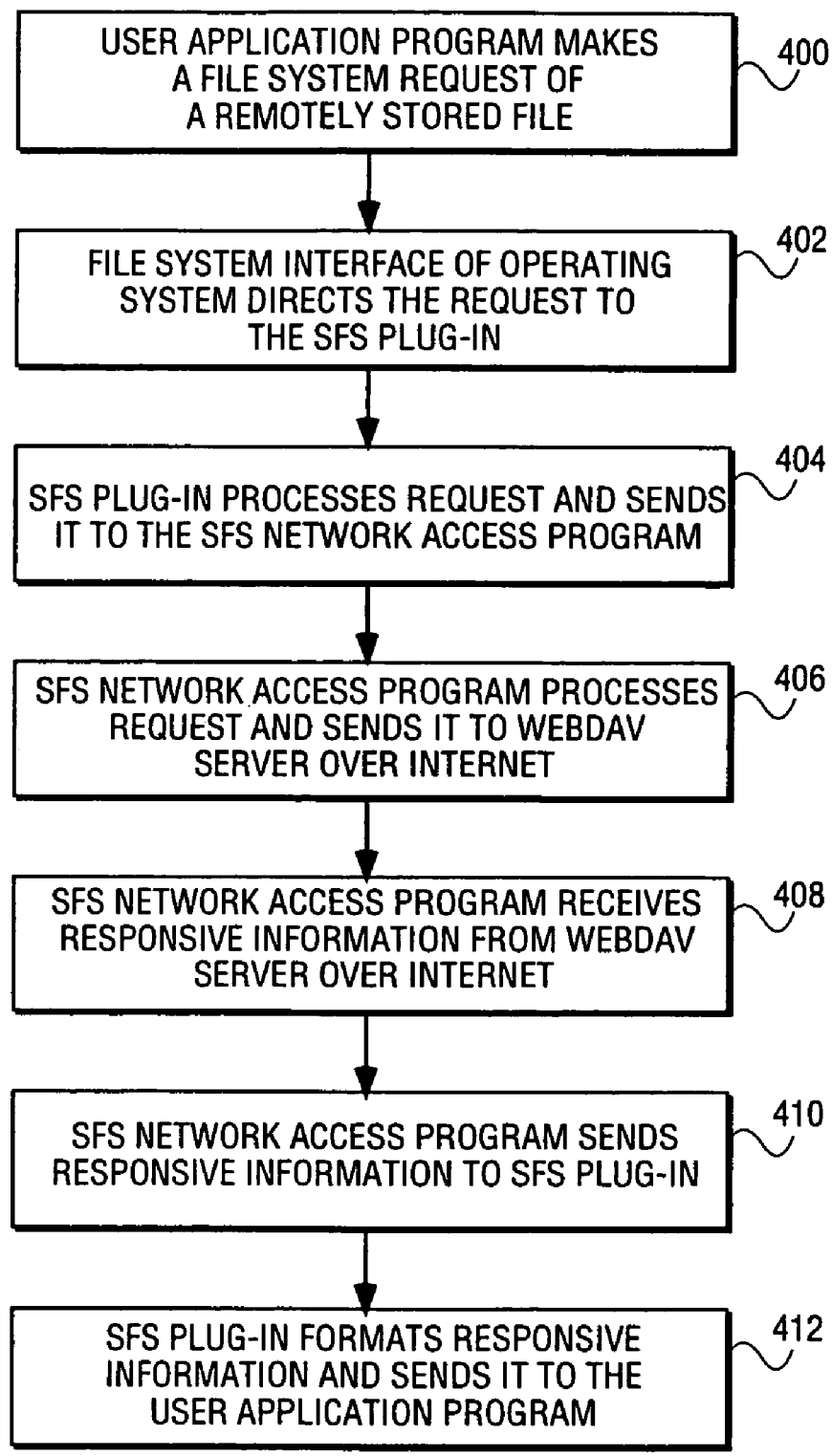
FIG. 4A depicts the flow of actions taken by a seamless file system according to one embodiment of the seamless file system method and system.

FIG. 4A depicts the flow of actions taken by a seamless file system according to one embodiment of the seamless file system method and system. A user via an application program such as a word processor makes a file system request involving a pathname and file that refers to a file on a WebDAV enabled HTTP server, as shown in block 400. By virtue of the SFS startup program having been run or other SFS initialization occurring, the file system interface of the operating system's application program interface will direct the request to the SFS plug-in, as shown in block 402. Then, the SFS plug-in processes the request and sends it to the SFS network access program, as shown in block 404. In one embodiment, the SFS plug-in establishes a socket connection with the SFS network access program, and sends the pathname or other identifier along with the appropriate parameters and a request type through the socket to the SFS network access program. The SFS network access program processes the request and sends it to the appropriate WebDAV enabled HTTP server to achieve the requested action, as shown in block 406. In one embodiment, the SFS network access program processes the request by examining the request type, reformatting the request in the appropriate WebDAV or HTTP format, and communicating over the internet with the appropriate WebDAV enabled HTTP server. Requested actions include, for example, delete a file, read a file, move a file between directories on the server, etc. The SFS network access program then receives a response from the WebDAV/HTTP server which includes information appropriate to the request, as shown in block 408. The response may include a WebDAV/HTTP status code. The SFS network access program then processes the response and returns status information and, in appropriate cases, other information to the SFS plug-in, in one embodiment, via a socket, as shown in block 410. The SFS plug-in formats the returned information, if needed, and sends status and returned information, if any, to the requesting user application program via the operating system's file system interface, as shown in block 412. In one embodiment, the SFS plug-in may reformat a WebDAV/HTTP status code as a local system error code.

Figure 4B:
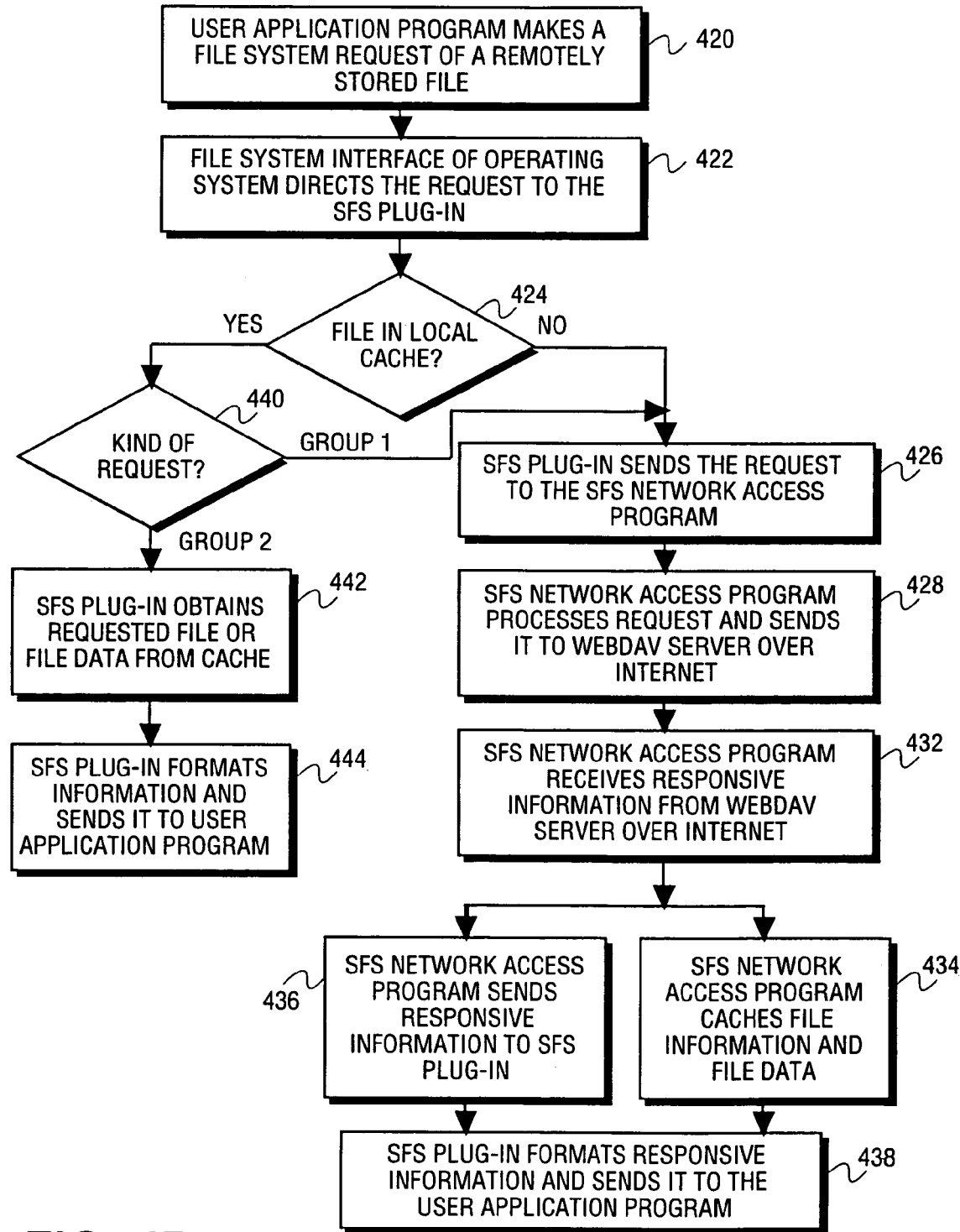
FIG. 4B depicts the flow of actions taken by a seamless file system according to one embodiment of the seamless file system method and system that includes caching.

FIG. 4B depicts the flow of actions taken by a seamless file system according to one embodiment of the seamless file system method and system that includes caching. A user via an application program makes a file system request for a remotely stored file on a WebDAV enabled HTTP server, as shown in block 420. In one embodiment, by virtue of the SFS startup program having been run or other SFS initialization occurring, the file system interface of the operating system's application program interface will direct the request to the SFS plug-in, as shown in block 422. The SFS plug-in then determines whether the file is in the local cache, as shown in block 424. If the remotely stored file is not cached locally, the SFS plug-in then sends the request to the SFS network access program, as shown in block 426. The SFS network access program processes the request and sends it to the appropriate WebDAV enabled HTTP server to achieve the requested action, as shown in block 428. If the request is a write request such as a write file, rename file, rename directory, etc., the request may include file data and file information needed to accomplish the write request. If the request is a read request, the request, may include a file name, file descriptor or identifier, etc. The SFS network access program then receives a response from the WebDAV/HTTP server which includes information appropriate to the request, as shown in block 432. The SFS network access program then processes the response and concurrently sends information responsive to the request to the SFS plug-in, as shown in block 436, and caches file information and file data in a local cache. The file information and data stored are dependent on the information received from the HTTP/WebDAV server and may include some or all of the file itself or a part thereof, file size, file name, path name, time and date file created, author information, access information, etc. The SFS plug-in then formats the information, if needed, and sends it to the requesting user application program via the operating system's file system interface, as shown in block 438.

If the requested file or file information was already in the local cache, as shown in block 424, a check is then made to determine what kind of request was made, as shown in block 440. In one embodiment, file requests may be defined as being in Group 1 or Group 2. Group 1 file requests are those requests that seek information about or modify information involving the internal contents of files. Examples of Group 1 requests include read a file, obtain a directory listing, write a file, etc. Group 2 requests are those requests that impact information about the file or treat the file as an object. Group 2 requests include requests to create or delete a file or directory, rename a file or directory, open a file to prepare it for I/O, etc. If the request is a Group 1 request, execution continues as discussed above at block 426. If the request is a Group 2 request, the SFS plug-in obtains the requested file or file information from the local cache, as shown in block 442, bypassing any communication with the remote WebDAV/HTTP server. The SFS plug-in then formats the information retrieved from the cache, if necessary, and sends it to the user application program. Depending on the request, the information sent to the user application program may be a directory listing, a file, the contents of a file, etc.

E. A Seamless File System Plug-In Extension to an Operating System

Figure 5:
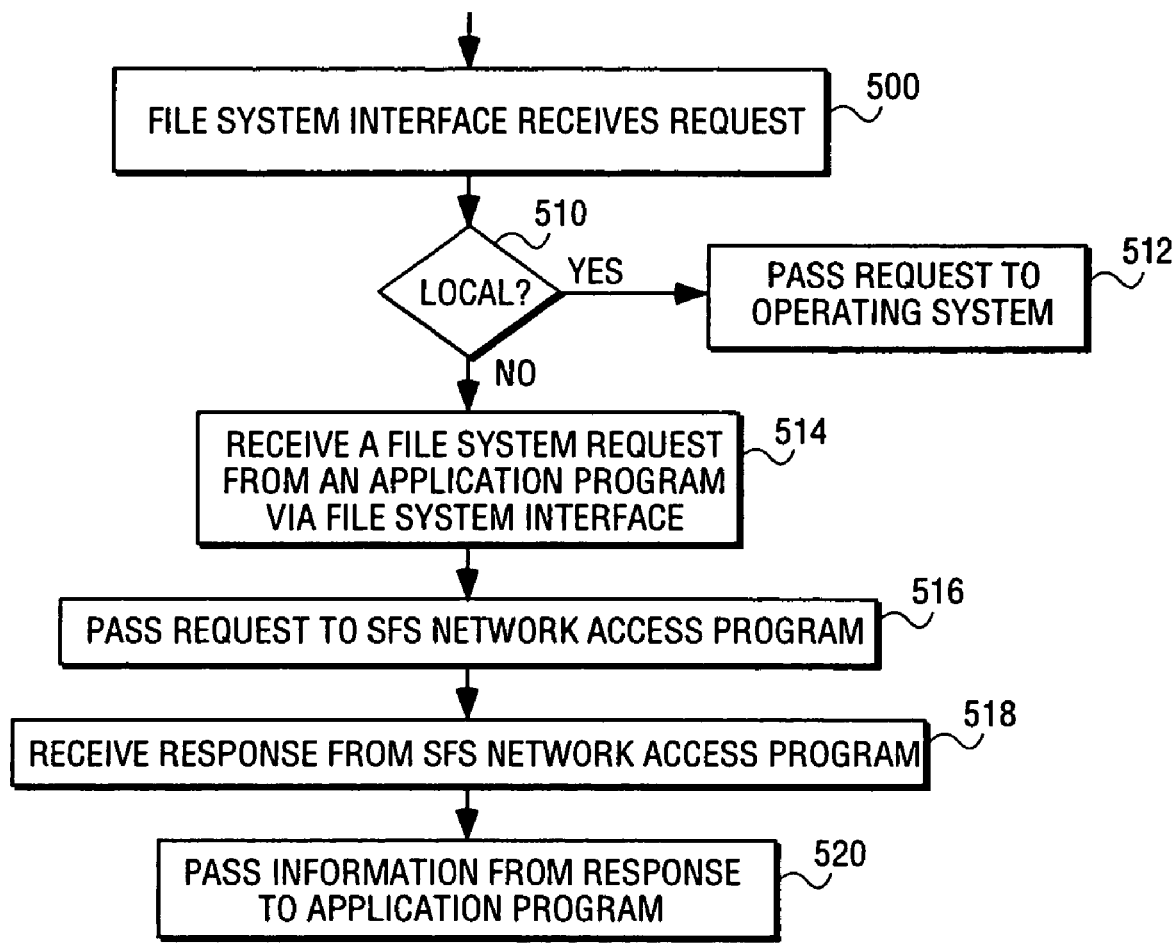
FIG. 5 depicts the flow of actions taken by a seamless file system plug-in extension to an operating system according to one embodiment of the seamless file system method and system.

FIG. 5 depicts the flow of actions taken by a seamless file system plug-in extension to an operating system according to one embodiment of the seamless file system method and system. When the SFS has been installed, the SFS includes the SFS plug-in extension to the computer system's operating system. More specifically, the SFS plug-in is an extension to the file system of the operating system. Upon a user requesting a file from a remote file system via an application program, the application program issues a request via a well known application program interface to the computer's file system. The file system receives this request, as shown in block 500, and, if the file request is for a local file, as shown in block 510, the request is passed to the operating system which then accesses the local file system, as shown in block 512. If the file request is not for a local file, as shown in block 510, local file system interface directs the request to the SFS plug-in. To simplify the discussion herein, prior art and well known methods of responding to requests for remotely stored files accessible via other protocols, systems and methods are not discussed, but may exist concurrently with SFS. The SFS plug-in receives the file system request that originated with a user request of an application program from the file system interface to the operating system, as shown in block 514. The SFS plug-in then passes the request to the SFS network access program, as shown in block 516. In one embodiment, the SFS plug-in also processes the request and formats it before passing the request to the SFS network access program. The SFS plug-in then receives a response from the SFS network access program, as shown in block 518. The SFS plug-in may process the response and pass information from the response to the requesting user application program via the local file system interface, as shown in block 520.

F. A Seamless File System Network Access Application Program

Figure 6:
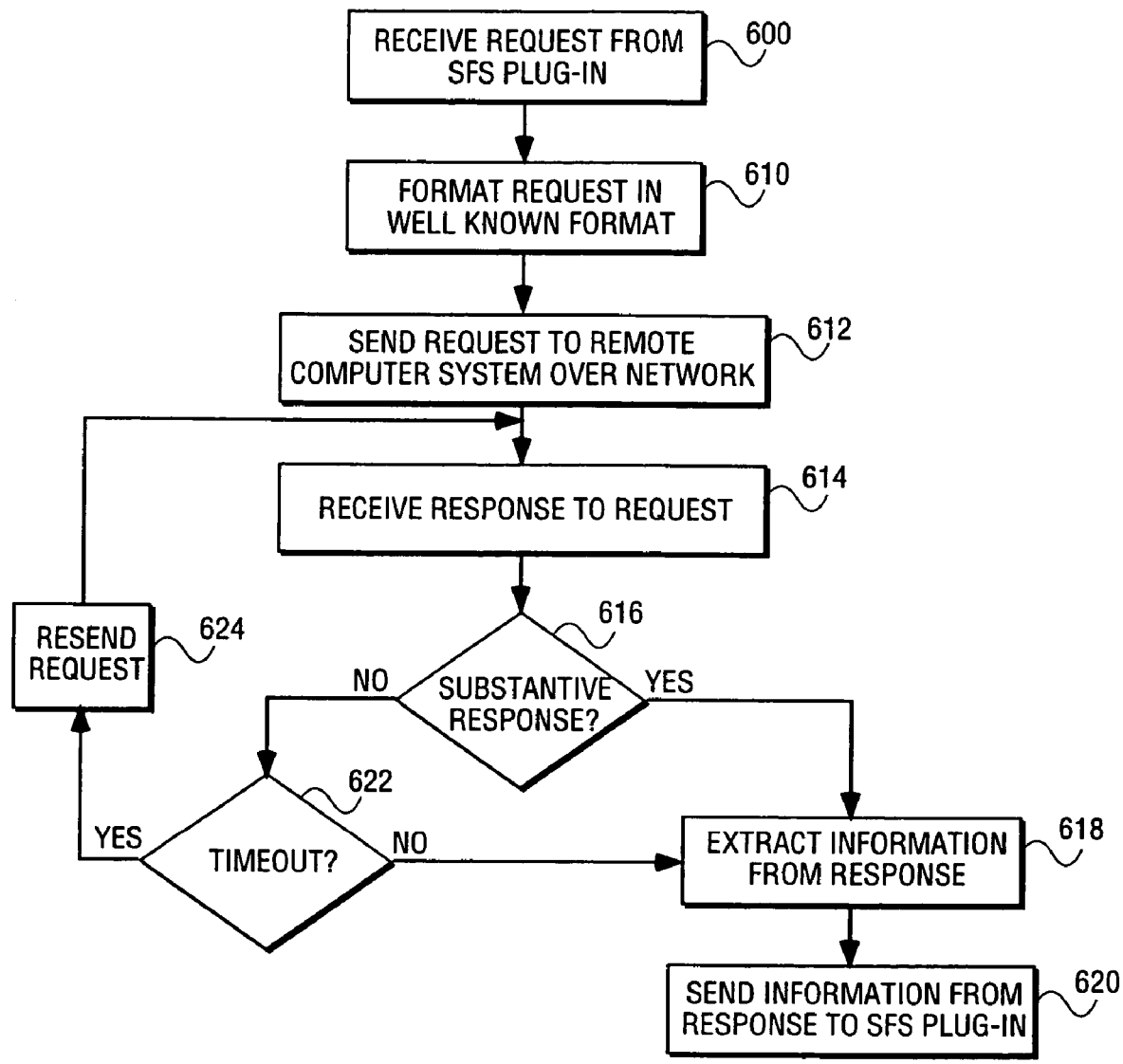
FIG. 6 depicts the flow of actions taken by a seamless file system network access application program according to one embodiment of the seamless file system method and system.

FIG. 6 depicts the flow of actions taken by a seamless file system network access application program according to one embodiment of the seamless file system method and system. As discussed above, after a user makes a request for a remotely stored file via an application program, the SFS network access program receives a request involving a remotely stored file from the SFS plug-in, as shown in block 600. The SFS network access program formats the request in a well known format to achieve the requested action, as shown in block 610. As discussed above, in one embodiment, the request is formatted as an HTTP request that may in some instances include a WebDAV method which may in some instances include further information in XML format. The SFS network access program then sends the request to a remote computer system over a network, as shown in block 612. In one embodiment, the SFS network access program then forwards the request to a user specified WebDAV/HTTP server over the internet. The SFS network access program receives a response to the request from the remote computer system, as shown in block 614. In one embodiment, the SFS network access program determines if the response is a substantive response as opposed to an error message, error code or a timeout, as shown in block 616. If the response is a substantive response, the SFS network access program extracts information from the response, as shown in block 618, and sends the information to the SFS plug-in, as shown in block 620.

If the response the SFS network access program received from the remote computer system was not a substantive response, as shown in block 616, the SFS network access program checks to determine whether an error message, error code or a timeout was returned, as shown in block 622. If the response was an error message or error code, execution continues at blocks 618 and 620, as already discussed, such that the error message or error code is extracted, may be translated, and is forwarded to the SFS plug-in. If the non-substantive response is a timeout, the request is resent, as shown in block 624, and execution continues at block 614, as discussed above.

In one embodiment, the SFS network access program maintains internal data structures to allow it to efficiently respond to requests from user application programs and process responses from remote computer systems. In one embodiment, to overcome limitations of the WebDAV extensions to HTTP, SFS locally caches remote files and remote file system information. In this embodiment, the SFS network access program creates and maintains cache files referred to as the SFS cache such that requests made regarding remotely stored files may be executed on locally stored copies of the files by the SFS plug-in. After operations on a particular file are completed, or in other appropriate circumstances, the modified cache file is then communicated to the remote server, thus, updating the file stored on the remote computer system and synchronizing the locally stored cache copy with the remotely stored file. Such caching is hidden from the SFS user. For example, in one embodiment, a request to open a file will result in the SFS network access program creating a cache file which contains the contents of the remote file. In such an embodiment, the SFS network access program returns a file descriptor to the newly created cache file, which is used for subsequent read and write operations by the requesting user application program and the SFS plug-in.

The SFS cache may be implemented according to any methods known to those skilled in the art. In one embodiment, "invisible caching" is used. In such an embodiment, immediately after the SFS network access program creates and opens a local cache file, the cache file is deleted such that the data for the local cache remains valid, but the name of the locally cached file is removed from the local file system directory. One advantage of "invisible caching" is that users are prevented from stumbling across cache files as the entire SFS cache is invisible to the user. Another advantage of using "invisible caching" is that all local cache files are created in a single directory, thus simplifying the management of the SFS cache. In such an embodiment, information reflecting the directory structure on the remote server may be saved as an invisible file.

In another embodiment, "parallel hierarchical caching" is used. Because the combination of WebDAV's name space definitions and the domain name registry essentially guarantees that all URIs are unique, a hierarchical local cache may be created based on the URIs supplied by users. In this embodiment, the directories in the cache persist and remain present in the name space. This embodiment creates a parallel local file hierarchy to that of each WebDAV server accessed. In this embodiment, only the files actually referenced by users need appear in the local SFS cache. In this embodiment, local cache files may be used recurrently, thus reducing the number of file requests to and file downloads from the network. An advantage of using "parallel hierarchical caching" is that the SFS network access program is not required to maintain a map of the locally replicated remote file system.

In yet another embodiment, "map caching" is used. In this embodiment, cache files are created with standard names such as sfs-000001, and a mapping from URIs to cache files is maintained by the SFS network access program and/or the SFS plug-in. Just as with "parallel hierarchical caching", in this embodiment, local cache files may be used recurrently, thus reducing the number of calls to and downloads from the network. Such an embodiment requires fewer calls to the local file system than "parallel hierarchical caching" to maintain the SFS cache.

In addition, in one embodiment, the SFS network access program maintains an array of file descriptors paired with URIs. When a file is opened and the SFS network access program opens a local cache file, in one embodiment, the SFS network access program places the file descriptor together with the specified URI in the next available array element. In such an embodiment, when processing an open file request, the SFS network access program returns the index into the array as a file handle to the SFS plug-in along with a file descriptor. The SFS plug-in uses the file descriptor to access the cached file. In this embodiment, subsequent operations which require activity by the SFS network access program result in the file handle being passed to the SFS network access program by the SFS plug-in such that the SFS network access program identifies the corresponding URI by accessing the array and then communicates with the appropriate remote server.

As discussed above, remote file requests are intercepted by the SFS plug-in and passed to the SFS network access program. The information passed between the SFS network access program and the SFS plug-in is specific to each operation supported but generally includes, in one embodiment, the URI of the remote file, or sufficient information for the SFS network access program to reconstruct the URI as set forth in the prior paragraph. In most cases the remote file requests will return either success or standard errors translated by the SFS network access program from the error values returned by the WebDAV/HTTP server.

Because of the transparent nature of the user interface, to provide for a uniform interface to all files requested by a user of a computer system, be the files remote or local, the user may specify all files, both remote and local, in the same manner using the syntax required of the local file system. That is, users of systems incorporating the SFS and local file system clients may request remotely stored files as if the files were locally stored according to the syntax defined by the local file system and local operating system. More specifically, an operating system in conjunction with a local file system defines which characters can and cannot be used in file names. However, the remote server may only support use of a subset of the characters allowed on the local file system. In one embodiment, the local file system allows for the use of a blank space, a left square bracket "[", right square bracket "]", pound sign "#", question mark "?" and other special or non-alphanumeric characters in file names. In various embodiments, the filenames may be represented by the operating system according to the American Standard Code for Information Exchange (ASCII) specification, the Unicode Transformation Format eight bit (UTF-8) encoding standard, etc. However, WebDAV enabled HTTP servers only accept file names in the form defined in the URI specification. (see above). The URI specification limits the use of characters to be used in file names to ASCII alphanumeric characters. The URI specification defines particular reserved or special uses for a list of special characters. To overcome the limitations of the character set allowed to represent file names on WebDAV/HTTP servers, the SFS network access program translates outgoing requests from the local operating system/file system format of allowed characters to a sequence of URI allowed characters in which the special characters are represented as escape sequences. Similarly, the SFS network access program reverse translates incoming information from the remote WebDAV/HTTP server which are in URI format to the format of the local operating system/file system, translating escape sequence characters into ASCII, UTF-8, etc.

The URI specification provides that the reserved, special characters may be represented by escape sequences. This allows for use of the special characters in a "hidden" manner and avoidance of any unintended interpretation of the special characters. The URI specification defines an escape sequence as a percent sign "%" followed by the two digit hexadecimal representation of the ASCII code of the special character. For example, if a remote file name is specified by a user of a local computer system to include a blank space such as the name "my file", the file name would be translated and represented as "my %20file" because 32 (decimal) is the ASCII code for blank space. Another example is "letter #1 (to Bob)" which is translated into "letter %20%231%20%28 to %20Bob %29". Upon receipt of file names, directory names, paths, etc. from a WebDAV/HTTP server in URI syntax, the file names, directory names, paths, etc. are reverse translated from the URI syntax into the local operating system syntax such as, for example, ASCII or UTF-8. In one embodiment, the SFS network access program performs the translation when the SFS network access program formats the request in a well known format, as shown in block 610, and may perform the reverse translation in any of blocks 614, 618, or 620.

G. Some SFS Supported Operations

Various file system operations may be supported by SFS. Such file system operations are well known in the art. Examples of some file system operations and how they may be implemented in one embodiment of SFS follow.

1. Opening and Closing Directories and Files

In one embodiment, the SFS plug-in serves as a pass through file system. In this embodiment, the SFS plug-in intercepts file system requests directed to a remote file system, manipulates the arguments, and instructs the local file system to perform a sequence of operations on the locally stored cache file corresponding to a requested remote file or remote directory. When opening a remote file, the open command causes the SFS network access program to create a cache file, issue the appropriate WebDAV method to lock the file exclusively on the remote server, issue the appropriate WebDAV/HTTP method to retrieve the contents of the target file from the remote WebDAV/HTTP server, and write the retrieved data into the newly created cache file. The SFS network access program sends a file handle to the SFS plug-in when the requested operation is complete. The SFS plug-in may retain the file handle of the cache file for future local access to a copy of the remote file. In this embodiment, subsequent file descriptor operations may be redirected to the cache file by the SFS plug-in. The file system interface of the local file system on which the local cache file resides is called to perform the file descriptor operations. On FSYNC or CLOSE, the SFS network access program issues the appropriate HTTP method to write the modified contents of the locally cached file to the remote server. The SFS network access program uses the file handle to identify which remote file to close and unlock.

The sequence of actions taken by SFS to open a directory is similar. In one embodiment, because the WebDAV protocol does not support directory enumeration, the SFS network access program issues a WebDAV PROPFIND request for all properties using the directory URI and specifying a header depth of one. In response, the WebDAV/HTTP server returns the specified properties of all of the items in the collection, that is, all files in the directory on the server. In one embodiment, the SFS network access program parses the returned XML property list to determine the names of the entries in the directory, and then builds a local cache file which allows the remote file system to be replicated according to the local computer system's directory listing style, complete with directory entries. The file descriptor for the locally cached file representing the remote directory listing is returned.

In one embodiment, a request to close a directory causes the SFS network access program to close the locally cached file representing the directory. In such an embodiment, no communication is necessary with the WebDAV/HTTP server.

2. Creating Files

When a create request is passed to the SFS network access program by the SFS plug-in, the SFS network access program sends the URI of the target file via a WebDAV PUT method to the remote WebDAV/HTTP server. If a cache file already exists for the directory where the new file entry is to be created, in one embodiment, the cache file is updated to include the newly created entry. In another embodiment, the cache file may be flushed and recreated to include the new file information.

3. FSYNC

In one embodiment, FSYNC is the primary synchronization routine used for moving data from the local cache to the server. FSYNC calls are communicated by the SFS plug-in to the SFS network access program using the file handle supplied by the SFS network access program in response to an OPEN request. The SFS network access program issues the appropriate WebDAV method to push the data back to the remote server. The SFS network access program also returns any errors received from the WebDAV/HTTP server to the SFS plug-in.

4. Get and Set Attributes

In one embodiment, attributes are retrieved and set by the SFS network access program via the PROPFIND and PROPATCH WebDAV protocol methods, respectively.

5. Creating Directories

In one embodiment, directory creation calls, which may be the well known MKDIR, cause the SFS network access program to issue a WebDAV MKCOL request to the WebDAV server to make a collection.

6. Reading a File

In one embodiment, read requests cause data to be read from the local cache file corresponding to the remotely stored file that was specified with the read request. If there is no locally cached copy of the requested remote file, the WebDAV extensions to the HTTP protocol support the ability to retrieve parts of a file without retrieving a whole file. Thus, when files are to be opened for read access only, the SFS network access program may retrieve only the requested portion of a file from the specified WebDAV/HTTP server for each read request.

7. Writing a File

In one embodiment, all write requests are performed on a locally cached copy of the specified remotely stored file. Written to files are synchronized on FSYNC or CLOSE. In other embodiments, more frequent synchronization between the locally cached version of the file and the remotely stored file may be achieved when certain conditions are met, such as, for example, at the conclusion of a predetermined period of time or when a predefined percentage of the locally cached file has been changed.

8. Reading a Directory

Reading a directory may be requested via the commonly known READDIR command. In one embodiment, a request to read a directory may be made only after the directory has been opened. In this embodiment, all read directory requests are redirected by the SFS plug-in to access a locally cached representation of the already opened requested remote directory.

9. Removing a Directory and Deleting a File

Upon receiving a request to remove a directory or delete a file on a remote server, in one embodiment, the SFS network access program issues a WebDAV DELETE request to the WebDAV/HTTP server specifying the requested URI and, when appropriate, the file to delete. If a locally cached representation of the remote directory exists for the directory containing the file to be deleted, in one embodiment, the locally cached copy of the remote directory listing is updated to remove the deleted entry. In another embodiment, the SFS network access program flushes the locally cached copy of the remote directory listing and recreates a locally cached copy of the directory listing by issuing a WebDAV PROPFIND request to the WebDAV/HTTP server for the appropriate URI and any subdirectory. If a locally cached copy of the remote file exists, the SFS network access program flushes the locally cached copy of the remotely stored file.

10. Truncate

In one embodiment, all truncate requests are performed on a locally cached copy of the specified remotely stored file. Truncated files are synchronized on FSYNC or CLOSE.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claim.

What is claimed is:

1. A system comprising:
 a storage device storing a local file hierarchy having a plurality of cache files, each of the plurality of cache files corresponding to one of a plurality of remote files stored remotely in association with web servers running a distributed authoring and versioning enabled hypertext transfer protocol (HTTP) coupled to internet;
 a memory device storing an application program, a network access application program, an operating system (OS) including a file system, and a system plug-in for extending the file system; and
 a processor coupled to the storage device and the memory device, the processor executing the application program to send a file system request involving one or more of the plurality of remote files to the file system, the processor executing the file system to direct the file system request to the system plug-in, wherein the plurality of cache files correspond to local files cached for the plurality of remote files, the file system request including a pathname for a URI (Uniform Resource Identifier) in a name space associated with a domain name registry, the processor executing the network access application program coupled to the internet, the network access application program to create the local file hierarchy in parallel with the pathname for the URI, the local file hierarchy including persistent directories present in the name space, the processor executing the system plug-in to:
  determine if the one or more of the plurality of remote files are locally cached in the local file hierarchy,
  determine, if the one or more of the plurality of remote files are locally cached, if the file system request belongs to a predetermined group of requests including at least one of a file read, a file write and a directory listing commands;
  forward the file system request to the network access application program via API (Application Programming Interface) over a socket connection, the network access application program sending the file system request as an HTTP protocol based request to one of the web servers, if the file system requests belongs to the predetermined group of requests, and
  send responsive information to the application program, the responsive information being received in response to the file system request,
 wherein the network access application program receives the responsive information from the one of the web servers according to the HTTP based protocol request, wherein the network access application program updates the plurality of local files according to the responsive information and wherein the file system request includes a name associated with the plurality of remote files.

2. The system of claim 1, wherein in response to the file system requests, the network access application program creates a local cache file, locks the remote file of the web server for exclusive access to prevent others from accessing the remote file at the web server, caches at least a portion of content of the remote file into the local cache file using one or more HTTP commands, and returns a file handle of the local cache file to the file system to enable the file system to process the file system requests using content of the local cache file.

3. The system of claim 2, wherein the local cache file is synchronized with the remote file stored in the web server when a predetermined period of time passes or a predetermined amount of content of the local cache file has been changed.

4. The system of claim 2, wherein after the file system requests have been processed, the network access application program writes modified portions of the local cache file back to the remote file, unlocks the remote file, and closes the remote file using one or more HTTP compatible commands.

5. The system of claim 2, wherein the network access application program maintains an array having a plurality of entries to store file descriptors of the local cache files paired with a URI (uniform resource indicator) of the remote file stored in the web server associated with the respective local cache file, wherein the network access application program returns an index of the corresponding entry as a file handler and the file descriptor to the file system, and wherein the file descriptor is used by the file system to access the respective local cache file and the index is used as a reference by the file system to instruct the network access application program to access the remote file using the corresponding URI.

6. A computer implemented method, comprising:
 receiving a file system request for a remote file at a file system of an operating system associated with a local file hierarchy having a plurality of cache files, each of the plurality of cache files corresponding to one of a plurality of remote files stored remotely over the Internet in a distributed authoring and versioning enabled hypertext transfer protocol (HTTP) server, the file system request being received as an ordinary file system request in a format other than a HTTP, the file system request including a pathname for a URI (Uniform Resource Identifier) in a name space associated with a domain name registry;
 creating the local file hierarchy in parallel with the pathname for the URI, the local file hierarchy including persistent directories present in the name space;
 determining if the remote file is locally cached in the local file hierarchy;
 if the remote file is locally cached, determining if the file system request belongs to a predetermined group of requests including at least one of a file read, a file write and a directory listing commands;

forwarding the file system request via API (Application Programming Interface) over a local socket connection to create an HTTP formatted request based on the file system request, if the file system request belongs to the predetermined group of requests;

forwarding the HTTP formatted request to the HTTP server;

receiving a response from the HTTP server;

updating the plurality of cache files according to the received response; and presenting the received response as an ordinary file system response.

7. The method of claim 6, further comprising:

creating a local cache file in response to the file system request;

locking a remote file being accessed by the file system request for exclusive access to prevent others from accessing the remote file, caching at least a portion of content of the remote file into the local cache file using one or more HTTP compatible commands; and returning a file handler of the local cache file, wherein the file handler is used to process the file system request using content of the local cache file.

8. The method of claim 7, further comprising synchronizing the content of the local cache file with the remote file when a predetermined period of time passes or a predetermined amount of content of the local cache file has been changed.

9. The method of claim 7, further comprising:

writing at least modified portions of the local cache file back to the remote file after the file system request has been processed;

unlocking the remote file; and closing the remote file using one or more HTTP compatible commands.

10. The method of claim 9, further comprising converting an HTTP status code to a corresponding local operating system error code.

11. The method of claim 7, further comprising maintaining an array having a plurality of entries, each entry including a file descriptor associated with the respective local cache file, the file descriptor being paired with a URI associated with a location of the remote file stored in an HTTP server.

12. The method of claim 11, wherein the file descriptor is used by the file system to access the respective local cache file and the URI is used by the network access application program to access the remote file.

13. The method of claim 12, wherein an index of an entry is used by the file system to instruct the network access application program to access the remote file using the URI stored in the entry referenced by the index.

14. A machine-readable medium having stored thereon instructions which when executed by a processor cause the machine to perform a method, the method comprising:

receiving a file system request for a remote file at a file system of an operating system associated with a local file hierarchy having a plurality of cache files, each of the plurality of cache files corresponding to one of a plurality of remote files stored remotely over the Internet in a distributed authoring and versioning enabled hypertext transfer protocol (HTTP) sewer, the file system request being received as an ordinary file system request in a format other than a HTTP, the file system request including a pathname for a URI (Uniform Resource Identifier) in a name space associated with a domain name registry;

creating the local file hierarchy in parallel with the pathname for the URI, the local file hierarchy including persistent directories present in the name space;

determining if the remote file is locally cached in the local file hierarchy;

determining, if the remote file is locally cached, if the file system request belongs to a predetermined group of requests including at least one of a file read, a file write and a directory listing commands;

forwarding the file system request via API (Application Programming Interface) over a local socket connection to create an HTTP formatted request based on the file system request, if the file system request belongs to the predetermined group of requests;

forwarding the HTTP formatted request to the HTTP server;

receiving a response from the HTTP server;

updating the plurality of cache files according to the received response; and presenting the received response as an ordinary file system response.

15. The machine-readable medium of claim 14, wherein the method further comprises:

creating a local cache file in response to the file system request;

locking a remote file being accessed by the file system request for exclusive access to prevent others from accessing the remote file, caching at least a portion of content of the remote file into the local cache file using one or more HTTP compatible commands; and returning a file handler of the local cache file, wherein the file handler is used to process the file system request using content of the local cache file.

16. The machine-readable medium of claim 15, wherein the method further comprises synchronizing the content of the local cache file with the remote file when a predetermined period of time passes or a predetermined amount of content of the local cache file has been changed.

17. The machine-readable medium of claim 15, wherein the method further comprises:

writing at least modified portions of the local cache file back to the remote file after the file system request has been processed;

unlocking the remote file; and closing the remote file using one or more HTTP compatible commands.

18. The machine-readable medium of claim 17, wherein the method further comprises converting an HTTP status code to a corresponding local operating system error code.

19. The machine-readable medium of claim 15, wherein the method further comprises maintaining an array having a plurality of entries, each entry including a file descriptor associated with the respective local cache file, the file descriptor being paired with a URI associated with a location of the remote file stored in an HTTP server.

20. The machine-readable medium of claim 19, wherein the file descriptor is used by the file system to access the respective local cache file and the URI is used by the network access application program to access the remote file.

21. The machine-readable medium of claim 20, wherein an index of an entry is used by the file system to instruct the network access application program to access the remote file using the URI stored in the entry referenced by the index.

22. A computer system comprising:
a memory storing instructions including at least one application program, an operating system, a system plug-in and a network access application program;
a network access unit coupled with a remote storage device storing a plurality of remote files;
a local storage device storing a plurality of cache files; and
a processor coupled with the memory, the network access unit and the local storage device, the processor being configure to execute the instructions from the memory to:
provide, according to the operation system, a file system associated with a local file hierarchy having the plurality of cache files to receive from the at least one application program a request involving the plurality of remote files stored remotely over the Internet in a hypertext transfer protocol (HTTP) server, each of the plurality of cache files corresponding to one of the plurality of remote files, the request including a pathname corresponding to a URI (Uniform Resource Identifier) in a name space associated with a domain name registry, the local file hierarchy including persistent directories present in the name space,
extend, according to the system plug-in, the file system of the operating system to receive the request, the system plug-in determining if the plurality of remote files are locally cached in the local file hierarchy, the system plug-in determining, if the plurality of remote files are locally cached, if the request belongs to a predetermined group of requests including at least one of a file read, a file write and a directory listing commands, the system plug-in receiving responsive information in response to the request, the system plug-in forwarding the responsive information to the file system for replying to the at least one application program with the information received, and
receive, according to the network access application program locally coupled with the system plug-in over a socket connection, the request from the system plug-in over API (Application Programming Interface), the network access application program to create the local file hierarchy in parallel with the pathname for the URI, the network access application program to update the plurality of cache files according to the responsive information, to translate a file name information specified in the request from a local file system syntax to a remote server syntax, and to package the request according to a distributed authoring and versioning enabled HTTP request to update the property of the plurality of remote files of the HTTP server over the Internet, and to receive the responsive information as an HTTP response from the HTTP server in response to the HTTP request.

23. A computer system apparatus, comprising:
a memory storing instructions;
a local storage device storing a plurality of cache files; and
a processor coupled with the memory and the local storage device, the processor being configured to execute the instructions from the memory to:
receive a file system request for a remote file at a file system of an operating system associated with a local file hierarchy having the plurality of cache files, each of the plurality of cache files corresponding to one of a plurality of remote files stored remotely over the Internet in a distributed authoring and versioning enabled hypertext transfer protocol (HTTP) server, the file system request being received f as an ordinary file system request in a format other than an HTTP, the file system request including a pathname corresponding to a URI (Uniform Resource Identifier) in a name space associated with a domain name registry,
create the local file hierarchy in parallel with the pathname for the URI, the local file hierarchy including persistent directories present in the name space,
determine if the remote file is locally cached in the local file hierarchy,
determine, if the remote file is locally cached, if the file system request belongs to a predetermined group of requests including at least one of a file read, a file write and a directory listing commands,
forward the file system request via API (Application Programming Interface) over a local socket connection to create an HTTP formatted request based on the file system request, if the file system request belongs to the predetermined group of requests,
forward the HTTP formatted request to the HTTP server for updating the property of the plurality of remote files,
receive a response from the HTTP server,
update the plurality of cache files according to the received response, and
present the received response as an ordinary file system response.

24. A computer implemented method, comprising:
receiving, at a system plug-in extending a file system within an operating system running within a computer system including a local file hierarchy having a plurality of cache files, a file system request to update the plurality of remote files stored remotely in Web server over the Internet from an application program, each of the plurality of cache files corresponding to one of the plurality of remote files, the file system request including a pathname for a URI (Uniform Resource Identifier) in a name space associated with a domain name registry, the local file hierarchy including persistent directories present in the name space, and the system plug-in being locally coupled to a network access application program over a socket connection;
the network access application program creating the local file hierarchy in parallel with the pathname for the URI;
the system plug-in determining if the plurality of remote files are locally cached in the local file hierarchy;
the system plug-in determining, if the plurality of remote files are locally cached, if the file system request belongs to a predetermined group of requests including at least one of a file read, a file write and a directory listing commands; and
if the file system request is determined to belong to the predetermined group of requests, the system plug-in forwarding the file system request to the network access application via API (Application Programming Interface) to be transformed into a network communications request conforming to a communications protocol acceptable by the Web server over the Internet, the file system receiving responsive information in response to the file system request, the system plug-in transferring the responsive information retrieved to the application program, the information being presented as an ordinary file system response,
wherein the transforming, forwarding, and transferring are performed transparently with respect to the application program, wherein the plurality of cache files is updated according to the responsive information received.

25. A machine-readable medium having stored thereon instructions which when executed by a processor cause the machine to perform a method, the method comprising:

receiving, at a system plug-in extending a file system within an operating system running within a computer system including a local file hierarchy having a plurality of ache files, a file system request to update the plurality of remote files stored remotely in a Web server over the Internet from an application program, each of the plurality of cache files corresponding to one of the plurality of remote files, the file system request including a pathname for a URI (Uniform Resource Identifier) in a name space associated with a domain name registry, the local file hierarchy including persistent directories present in the name space, and the system plug-in being locally coupled to a network access application program over a socket connection;

the network access application program creating the local file hierarchy in parallel with the pathname for the URI;

the system plug-in determining if the plurality of remote files are locally cached in the local file hierarchy;

the system plug-in determining, if the plurality of remote files are locally cached, if the file system request belongs to a predetermined group of requests including at least one of a file read, a file write and a directory listing commands; and if the file system request is determined to belong to the predetermined group of requests, the system plug-in forwarding the file system request to the network access application via API (Application Programming Interface) to be transformed into a network communications request conforming to a communications protocol acceptable by the Web server over the Internet, the file system receiving responsive information in response to the file system request, the system plug-in transferring the responsive information retrieved to the application program, the information being presented as an ordinary file system response, wherein the transforming, forwarding, and transferring are performed transparently with respect to the application program, wherein the plurality of cache files is updated according to the responsive information.

26. An apparatus, comprising:

means for receiving, at a system plug-in extending a file system within an operating system running within a computer system including a local file hierarchy having a plurality of cache files, a file system request to update the plurality of remote files stored remotely in a Web sewer over the Internet from an application program, each of the plurality of cache files corresponding to one of the plurality of remote files, the file system request including a pathname for a URI (Uniform Resource Identifier) in a name space associated with a domain name registry, the local file hierarchy including persistent directories present in the name space, and the system plug-in being locally coupled to a network access application program over a socket connection;

means for creating, at the network access application program, the local file hierarchy in parallel with the pathname for the URI;

means for determining, at the system plug-in, if the plurality of remote files are locally cached in the local file hierarchy;

means for determining, at the system plug-in, if the plurality of remote files are locally cached, if the file system request belongs to a predetermined group of requests including at least one of a file read, a file write and a directory listing commands; and if the file system request is determined to belong to the predetermined group of requests, means for forwarding, at the system plug-in, the file system request to the network access application via API (Application Programming Interface) to be transformed into a network communications request conforming to a communications protocol acceptable by the Web server over the Internet, the system plug-in receiving responsive information in response to the file system request, the file system transferring the responsive information received to the application program, the information being presented as an ordinary file system response, wherein the transforming, forwarding, and transferring are performed transparently with respect to the application program, wherein the plurality of cache files is updated according to the responsive information received.

* * * * *

UNITED STATES PATENT AND TRADEMARK OFFICE
CERTIFICATE OF CORRECTION

| | | |
|---|---|---|
| PATENT NO. | : 7,693,962 B2 | |
| APPLICATION NO. | : 10/994007 | |
| DATED | : April 6, 2010 | |
| INVENTOR(S) | : Bertrand Serlet et al. | |

It is certified that error appears in the above-identified patent and that said Letters Patent is hereby corrected as shown below:

In column 1, line 11, delete "a the" and insert -- the --, therefor.

In column 1, line 53, delete "www dot ietf dot org" and insert -- www.ietf.org. --, therefor.

In column 1, line 58, delete "www dotw3c dot org;" and insert -- www.w3c.org; --, therefor.

In column 2, line 6, delete "HTTP1.1," and insert -- HTTP/1.1, --, therefor.

In column 2, lines 15-16, delete "www dot w3dot org/TR/RED-xml" and insert -- www.w3.org/TR/REC-xml --, therefor.

In column 2, line 28-29, delete "www dot sharemation dot com" and insert -- www.sharemation.com --, therefor.

In column 2, lines 29-30, delete "www dot MyDoesOnline dot com" and insert -- www.MyDoesOnline.com --, therefor.

In column 2, line 31, delete "www dot driveway dot com" and insert -- www.driveway.com --, therefor.

In column 13, line 28, delete "claim." and insert -- claims. --, therefor.

In column 15, line 63, in Claim 14, delete "sewer," and insert -- server, --, therefor.

In column 17, line 67, in Claim 23, after "received" delete "f".

In column 20, line 7, in Claim 26, delete "sewer" and insert -- server --, therefor.

Signed and Sealed this
Eighth Day of November, 2011

David J. Kappos
*Director of the United States Patent and Trademark Office*